United States Patent

Ginestet i Cusso

[11] Patent Number: 5,403,443
[45] Date of Patent: Apr. 4, 1995

[54] CARDBOARD WITH HIGH RESISTANCE TO TEARING AND METHOD OF MANUFACTURING SAME

[76] Inventor: Ramon Ginestet i Cusso, Placa de l Estacio, No. 2, E - 25230 Mollerussa, Spain

[21] Appl. No.: 958,339
[22] PCT Filed: May 6, 1992
[86] PCT No.: PCT/EP92/00989
 § 371 Date: Dec. 16, 1992
 § 102(e) Date: Dec. 16, 1992
[87] PCT Pub. No.: WO92/20863
 PCT Pub. Date: Nov. 26, 1992

[30] Foreign Application Priority Data
 May 14, 1991 [ES] Spain .................................. 9101472

[51] Int. Cl.⁶ ...................... D21F 11/00; D21F 11/08
[52] U.S. Cl. .................................. 162/124; 162/123; 428/247; 428/481
[58] Field of Search ............... 428/247, 481, 534, 233, 428/239, 255, 476.6; 162/124, 123

[56] References Cited

U.S. PATENT DOCUMENTS

| | | |
|---|---|---|
| 1,339,910 | 4/1920 | Munroe . |
| 2,543,101 | 2/1951 | Francis, Jr. . |
| 3,892,622 | 7/1975 | Skaugen . |
| 4,634,621 | 1/1987 | Manning et al. ............... 428/247 X |
| 4,637,949 | 1/1987 | Manning et al. ............... 428/247 X |
| 4,731,276 | 3/1988 | Manning et al. ............... 428/247 X |
| 5,139,841 | 8/1992 | Makoui et al. ................. 428/240 X |

FOREIGN PATENT DOCUMENTS 551610 4/1941 United Kingdom .
759472 11/1951 United Kingdom .

OTHER PUBLICATIONS

1004 Abstract Bulletin 59(1988) Jul., No. 1, Appleton, Wis., "Strength Properties of Filament Reinforced Paperboard Packaging".

*Primary Examiner*—Daniel R. Zirker
*Attorney, Agent, or Firm*—Anderson Kill Olick & Oshinsky

[57] ABSTRACT

The present invention requires less natural timber for the fabrication of a cardboard having high resistance to tearing by incorporating at least two layers from cellulose, in between which a woven-fabric layer or scrim from natural or synthetic fibers is disposed, wherein the cellulose layers and the scrim are configured as composite members formed in the moist state.

8 Claims, 1 Drawing Sheet

CARDBOARD WITH HIGH RESISTANCE TO TEARING AND METHOD OF MANUFACTURING SAME

FIELD OF THE INVENTION

The invention deals with a cardboard having a high resistance to tearing and a method to manufacture such a cardboard.

BACKGROUND OF THE INVENTION

For any type of packaging suitable for load-carrying functions of the packaged material, it is nowadays customary to utilize so-called Kraft liners from carton. These Kraft liners are distinguished by a high tearing resistance and preferably consist of long fiber cellulose. In order to manufacture such Kraft liners it is therefore necessary to use long-fibered wood, for instance pine or fir. These long-fibered types of timber have however the property of growing very slowly, so that the steadily increasing requirement for such packaging always results in irreparable damage being done to the woodlands or forest stands.

The above disadvantages occur not only in the manufacture of tear-resistant cartons, rather in other types of cardboard or carton, since it is always necessary to use pure natural timber for achieving adequate strength, wherein in each application case appropriately dimensioned cartons with a sufficient wall thickness must be used, which correspondingly increases the consumption of wood or timber. Another disadvantage in the know carton manufacture lies in that very large quantities of water are required in its manufacture, which is not justifiable from the environmental effect point of view and from the foreseeable development of the water reserve.

SUMMARY OF THE INVENTION

It is a task of the invention to create a solution by means of which cardboard or paper board can be made available maintaining the necessary strength standards, which require considerably less natural timber or even none at all for its fabrication and whose fabrication overall is much more environment friendly.

This task is solved in the invention by cardboard having high resistance to tearing incorporating at least two layers from cellulose, in between which a woven-fabric layer or scrim from natural or synthetic fibers is disposed, wherein the cellulose layers and the scrim are configured as composite members formed in the moist state.

The invention enables to make a tear-resistant carton or cardboard available, which, with the same or better strength properties compared to conventional cardboard, requires a considerably lower share of cellulose, meaning the cardboard can be fabricated with considerably lower material consumption and with a considerably smaller carton thickness, which however has the same strength properties. Herein there is formed a composite member by the interconnection of moist viscous cellulose layers with the interposed scrim from natural or synthetic fibers and subsequent pressing, meaning the fibers of the two layers interengage and engage into the scrim, so that a completely uniform member is formed in a single manufacturing step. Herein because of the deposition of the textile layer or scrim, the resistance to tearing of the cardboard is approximately the same in all directions. Because of the considerably lower cellulose share compared to known cardboard (Kraft liners) the energy- and water consumption can also be decisively reduced.

It is particularly advantageous if the cellulose layers consist of waste paper. Compared to the known such cartons, where waste paper cannot be used, since the cellulose fibers of waste paper are comparatively short fibers and therefore do not exhibit the required strength properties, it is possible in the invention to utilize only waste paper, since the strength of the carton is provided solely by the intimate connection between the cellulose fibers and the enclosed netting. At the same time the consumption of energy and water in manufacture can be still additionally reduced by using waste paper. For the scrim it was shown to be particularly advantageous to utilize a natural fiber from cotton, wool or silk or synthetic fibers from polyacrylonitrile, which is generally known as DRALON TM, or polyester.

It is advantageously provided for increasing the strength and improving the formation of the composite structure, to dispose respectively one organic bonding layer between the individual layers. The bonding agent is herein dissolved by bringing the moist layers together and subsequently contributes towards a particularly strong interconnection between the individual layers.

If the carton is to be suitable to be printed on, meaning we are dealing with a lithography carton, the invention provides additionally for disposing a cover layer suitable for application of printing upon the external cellulose layer.

For solution of the previously defined task, the invention also supplies a method for manufacture of the previously described cardboard, which is distinguished by, to begin, with supplying a viscous mass of cellulose, then applying a scrim from natural or synthetic fibers on said mass and that subsequently an additional viscous mass from cellulose is applied to the scrim and that all these layers are pressed together.

It is possible in a simple manner by the inventive method, to manufacture a previously described tear-resistant cardboard, wherein a connection of the individual fibers of the cellulose layers with each other and in between the textile layer occurs by the interconnection and compaction of the cellulose layers with the scrim in the viscous state of the cellulose, so that a composite member is formed, without additional method steps and without additional materials, as for instance bonding agents, meaning the individual fibers of the cellulose layers intergrip right through the scrim fabric. Here, in spite of the introduction of the foreign body, the scrim, which is neutral with respect to water, the water can escape when the cardboard dries, so that no bubble formation or other complications arise, rather in the end result, a cardboard is available which has a completely smooth surface.

For achieving an especially high tear resistance and an especially good formation of composite members, the scrim before being applied upon the cellulose mass, is covered with an organic adhesive soluble in water. If then the scrim is applied to the first cellulose mass still in the viscous state, the organic adhesive or bonding agent is dissolved and develops the bonding or adhesive function, whereby by subsequent means of compaction a particularly good connection is formed between the cellulose layer and the scrim layer.

Herein, it is then also advantageously provided that, prior to application of the second viscous cellulose mass, an organic water soluble adhesive is pulverized onto the application side of the cellulose mass, so that then an especially good connection between this cellulose layer and the textile layer as well as the bottom cellulose layer is also formed.

It is provided in a refinement of the invention, that after the assembly and compaction of the cellulose masses with the scrim disposed in between, at least an additional cover layer which is suitable of being printed on is applied. This additional cover layer is necessary if cardboard susceptible of being printed on is desired, wherein then the printable surface is formed by the cover layer. This cover layer can however have a very small thickness, since it does not need to contribute in the strength of the carton proper.

BRIEF DESCRIPTION OF THE DRAWINGS

In the following the invention is explained with particularity with the help of a drawing showing examples thereof. It is shown on.

DESCRIPTION OF THE PREFERRED EMBODIMENTS

Figure 1:
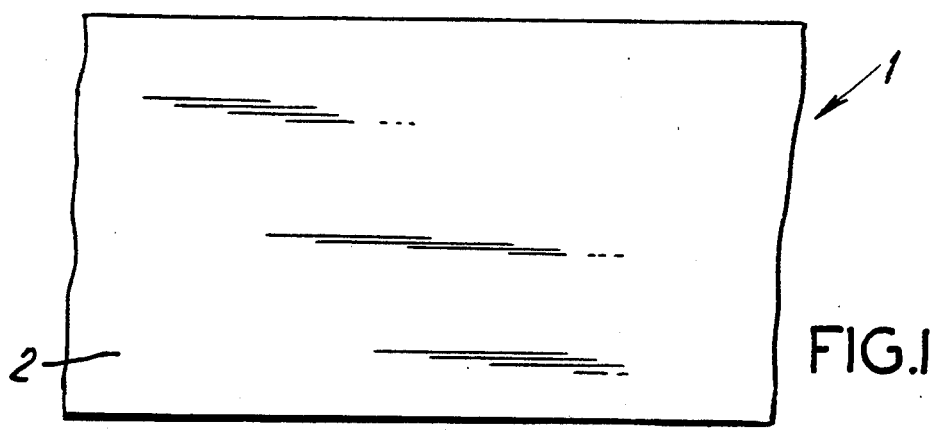
FIG. 1 a front view of cardboard in the invention.
Figure 2:
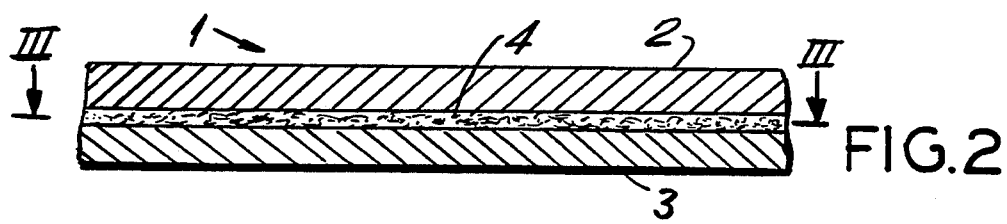
FIG. 2 a magnified section through cardboard in FIG. 1.

A cardboard with high tearing strength per the invention generally designated by 1 has in the embodiment example in FIG. 2 two external cellulose layers, a first cellulose layer 2 and a second cellulose layer 3. Herein these cellulose layers consist preferably of waste paper, however naturally other cellulose fibers can also be used here.

A scrim 4 from natural or synthetic fibers is disposed between the two cellulose layers 2 and 3. Herein for instance, a fiber net from cotton, wool or silk or from Dralon TM or polyester can be utilized. The scrim 4 can herein be configured in different ways, the meshes or stitches can be differently spaced, for particularly tear-resistant cartons a correspondingly smaller mesh distance is selected.

The cardboard 1 from at least two cellulose layers 2 and 3 and the scrim 4 arranged therebetween is configured as a composite member, this means that it is assured by a manufacturing process, which will be described below, that the fibers of the two cellulose layers designated by the reference number 5 in FIG. 3 grip, on one hand, in between the textile structure 4 and on the other hand in between the fibers of the other cellulose layer 2 or 3 arranged thereon. The fibers 5 thus interhook with the scrim 4 so that an intimate connection of the individual layers 2, 3, 4 is established.

Figure 3:
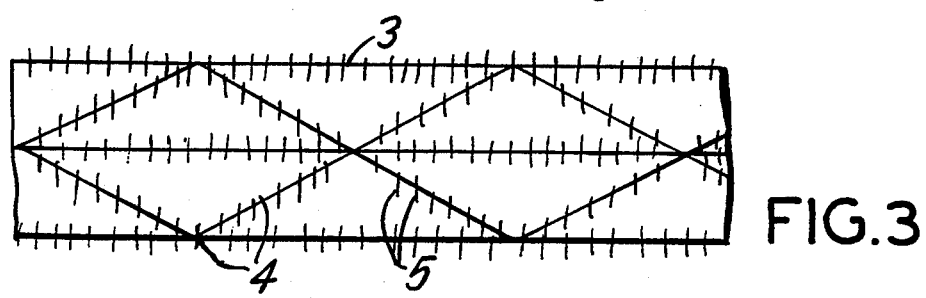
FIG. 3 a section along the line III—III in FIG. 2.

Even if this is now shown in FIGS. 2 and 3, it can be provided for improving the connection and for achieving an even higher tearing strength, that a water soluble organic adhesive layer is respectively disposed in between the individual layers, which expediently causes an even better connection of the individual layers.

Figure 4:
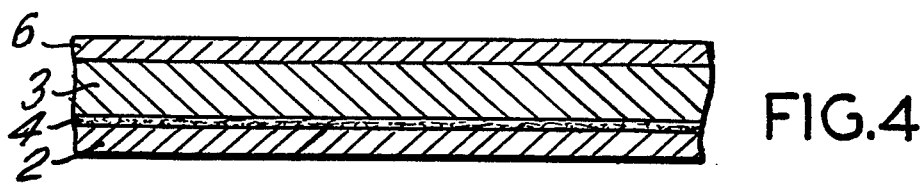
FIG. 4 a section through a cardboard in another embodiment.

FIG. 4 shows another embodiment of the invention. To begin with, two cellulose layers 2 and 3 are also provided, in this embodiment form on opposite sides of the scrim 4. However, an additional layer 6 from cellulose is provided on the upper side of the second cellulose layer 3, this being especially bleached cellulose, which can be bonded or glued upon the cellulose layer 3. This layer is suitable for printing, so that the cardboard 1, if it is to be used as packaging material, can also serve as printed legend carrier. This arrangement assures that even if in manufacturing the cardboard 1 the scrim 4 continues into the cellulose layers 2 and 3, a completely smooth and perfect top layer 6 of the cardboard 1 is available.

Figure 5:
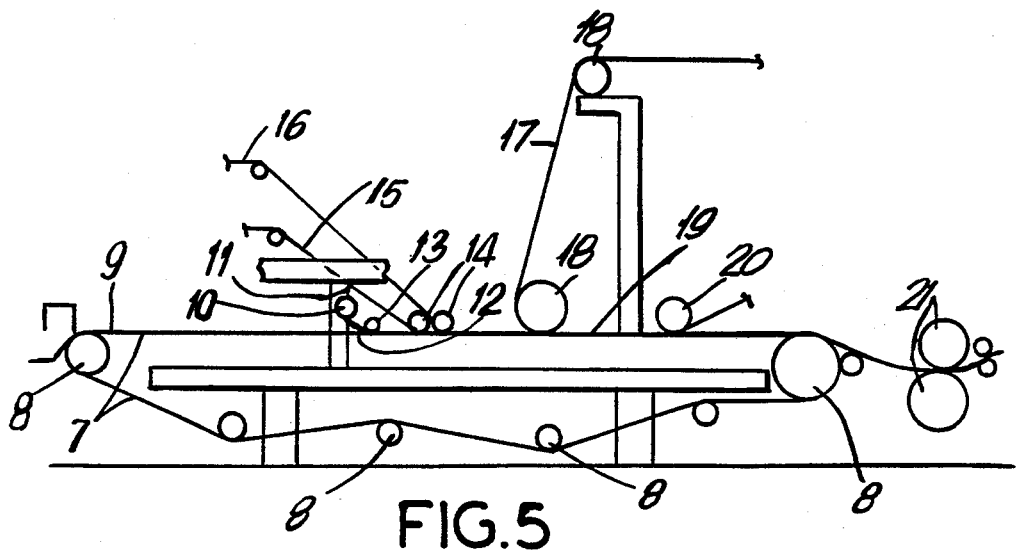
FIG. 5 a basic diagram of a machine for performing the method in the invention for manufacture of the cardboard per the invention.

How the cardboard 1 is manufactured is essential for the invention. A basic sketch of a machine is manufactured for effecting the method in FIG. 5, wherein a viscous mass of cellulose is shown supplied on a revolving sieve-shaped conveyor belt 7 with drive- and reversing-rollers, which mass is indicated by the reference number 9. Simultaneously a fabric or textile net 11 from natural or synthetic fibers is supplied by an appropriate drive- and reversing-roller 10, which fabric has, for instance, a mesh structure 4 (FIG. 3). This fabric net has herein the same width as the supplied viscous cellulose mass 9. Preferably the fabric net 11 is lined on the application side by an adhesive layer 12 from water soluble organic adhesive. The fabric 11 is then directed with its adhesive side 12 upon the viscous cellulose mass 9 and is pressed against this by means of a roller 13 in such a way, that the fabric is placed upon the moist cellular mass 9.

Subsequently a second viscous mass from cellulose is added from the top, meaning from the side where the textile structure is disposed, by means of an appropriate roller 14 or possibly additional arrangements, this mass is designated by the numeral 15. This cellulose mass 15 herein preferably also comprises an adhesive layer from organic water soluble material on the application side, which is powder-sprayed, appropriate nozzles are not shown on the drawing. This second cellulose mass 15 is also supplied by a revolving screen- or sieve-shaped conveyor belt, of which only segments are shown (reference number 16). If a lithographic cardboard is to be fabricated, an additional layer which can be printed on preferably from pure cellulose is subsequently added, this layer is outlined in FIG. 5 by the reference number 17, appropriate conveying- or feed-rollers are designated by 18. Thus, a four-layer formation is present in the region 19 of the conveyor belt 7, as this is shown in FIG. 4. In order to achieve a perfect interconnection of the individual layers into a composite member, the superposed four layers are compacted in several pressing processes in the moist state into a composite member, appropriate pressing rollers are partially shown and designated by 20 and 21, wherein pressing roller 21 is preferably configured as a suction roller, meaning this roller already removes a portion of the water. Due to this compaction the swelling fibers of the cellulose masses (reference number 5 in FIG. 3) grip into the textile structure 4 and hook themselves into same as well as also into the other cellulose layers.

Thus, it is essential in the process of the invention that the individual layers are led together in the viscous meaning moist state of the cellulose masses and be compacted in such a way, that an intimate connection between the individual layers is formed, thus a composite member, where the individual layers intergrip with their fibers 5 still swelling in the moist state and especially also embrace the scrim 4. The respectively required quantity of water and the compaction pressure depend therein respectively on the cellulose material.

The finished cardboard 1 is subsequently directed for drying and can then be cut into appropriate pieces or the like.

It can additionally be provided in certain individual cases for achieving even more improved connection of the individual layers, that starch be introduced between the layers or that the layers be electrically charged to different levels, in order to obtain a subsequent attraction.

It was seen, that such a cardboard has an outstanding tenacity or tearing strength, wherein, compared to the known Kraft liners from natural fiber meaning from correspondingly long fibered timber, on the one hand, considerably less cellulose material is required since considerably smaller wall thicknesses result in the same strength, and on the other hand, pure waste paper can also be used for the cellulose layers, since the strength itself is generated by the bond between the also short fibers of the cellulose layers and the interposed textile structure 4. Because of the considerably lower cellulose requirement and especially when using waste paper, considerably lower energy and water quantities are necessary for the same quantity of cardboard compared to conventional cardboard.

Subsequently, a comparative example is given for illustrating the advantages of the novel cardboard compared to the known cardboard, wherein a conventional cardboard and a cardboard in the invention of a weight of 500 g/m$^2$ respectively are examined or tested:

| Test Measurements of Cardboard Resistance Values | | | | |
|---|---|---|---|---|
| | Cardboard per the Invention | | Normal Cardboard | |
| | Lateral Direction | Longitudinal Direction | Lateral Direction | Longitudinal Direction |
| Bursting pressure of the carton (kg/cm$^2$) | 5.1 | | 5.2 | |
| Force required for tearing apart (N) | 103 | 220 | 128 | 210 |
| Increase in length prior to tearing | 3.2 | 1.3 | 3.3 | 1.6 |
| Weight for tearing (%) under torsional loads (g) | 287 | 896 | 726 | 238 |

It is easily seen that the cardboard in the invention has greatly improved mechanical properties compared to the conventional cardboard.

Naturally, the invention is not limited to the embodiment examples shown in the drawing. Other embodiments of the invention are possible without abandoning its basic thought. Thus, if it is required in particular, the cardboard can evidently also consist of more than two cellulose layers 2, 3 with interposed scrim 4 or more of the same.

I claim:

1. A method of manufacturing a composite cardboard, comprising the steps of:

providing a first layer of a viscous cellulose mass having a predetermined width;

depositing a scrim having a width equal to the width of the first layer onto the first layer when the first layer is still in a viscous state;

depositing a second layer of a viscous cellulose mass onto the scrim;

compacting the first layer, the scrim, and the second layer to form a three-layer structure; and drying the manufactured three-layer structure to form the composite cardboard.

2. A method according to claim 1, further comprising the steps of providing an adhesive layer on one of mutually contacting surfaces of the first layer and the scrim before depositing the scrim onto the first layer; and providing an adhesive layer on a contact surface of the second layer, which contacts the scrim, before depositing the second layer, onto the scrim.

3. A method according to claim 1, wherein said compacting step includes the step of pressing the scrim against the first layer before depositing the second layer onto the scrim.

4. A method according to claim 1, further comprising the step of depositing an additional layer, which can be printed on, onto the second layer before compacting.

5. A method according to claim 1, wherein said compacting step is effected with suction roller means, whereby the manufactured three layered structure is partially dried.

6. A method according to claim 1, comprising the steps of forming the first and second layers from waste paper.

7. A method according to claim 1, comprising the step of forming the scrim of a material selected from a group consisting of cotton, wool, silk, glass fibers, and polyester.

8. A method according to claim 2, wherein said step of providing an adhesive layer on one of mutually contacting surfaces and said step of providing an adhesive layer on a contact surface further includes providing a layer of a water soluble organic adhesive for each of said two adhesive layers.

* * * * *